March 30, 1948.    G. V. WOODLING    2,438,529
SLEEVE NUT COUPLING
Filed Jan. 25, 1945

INVENTOR.
BY George V. Woodling

Patented Mar. 30, 1948

2,438,529

UNITED STATES PATENT OFFICE 2,438,529

SLEEVE NUT COUPLING

George V. Woodling, Cleveland, Ohio

Application January 25, 1945, Serial No. 574,467

5 Claims. (Cl. 285—97.1)

My invention relates in general to coupling devices and more particularly to sleeve nut coupling devices or members for tube fittings.

An object of my invention is the provision of making a turnable connection between the tube and the sleeve nut coupling member whereby the coupling member may be threadably connected to a threaded fitting element without twisting the tube.

Another object of my invention is the provision of making an expansion fit between the sleeve nut coupling member and the tube and of sealing the clearance between the coupling member and the tube whereby the expansion fit in combination with the sealing provision is turnable so that the sleeve nut coupling member may be threadably connected to a threaded fitting element without twisting the tube.

Another object of my invention is the provision of making the sealing means which comprises resilient and substantially noncompressible material subject to compression, whereby the sealing action becomes greater as the fluid pressure increases.

Another object of my invention is the provision of making an expansion fit between the tube and the sleeve nut coupling member and of positioning the sealing means which comprises resilient and substantially noncompressible material between the expansion fit.

Another object of my invention is the provision of blocking extrusion of the sealing means between the tube and the sleeve nut coupling member.

Another object of my invention is the provision of making an expansion fit wherein the expansion fit produces a piston effect between the tube and the sleeve nut coupling member so as to block extrusion of the sealing means between the tube and the coupling.

Another object of my invention is the provision of locating the sealing means in the hexagonal nut portion of the sleeve nut coupling member.

Another object of my invention is the provision of connecting the tube to the coupling member whereby vibration of the tube is absorbed.

Figure 1:
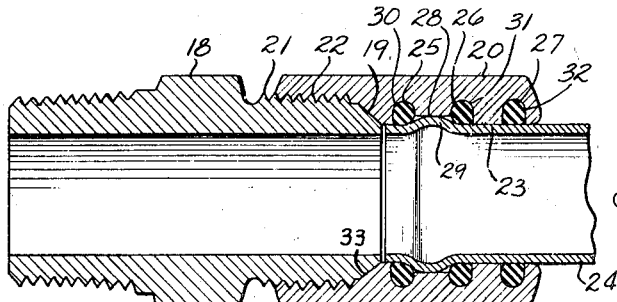
Figure 2:
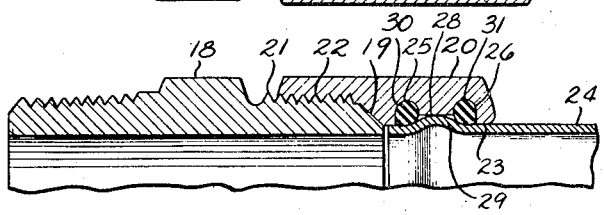
Figure 4:
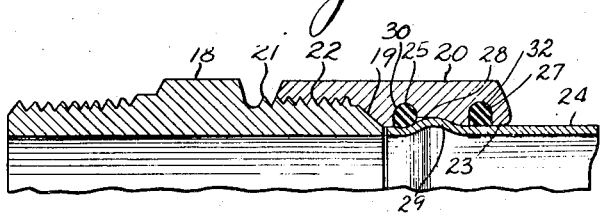
Figure 3:
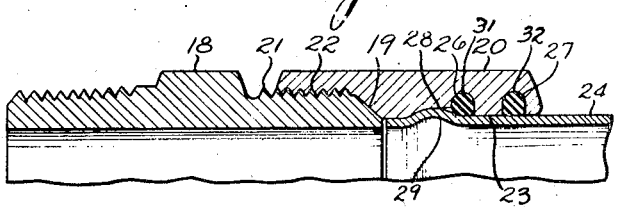

Other objects and a fuller understanding of my invention may be had by referring to the following description and claims, taken in conjunction with the accompanying drawing, in which:

Figure 1 is a longitudinal cross-sectional view of my sleeve nut coupling member embodying the features of my invention; and Figures 2 to 4, inclusive, show sub-combinations of the invention shown in Figure 1;

With reference to the Figure 1 of the drawing, my invention is shown as being applied to a sleeve nut coupling member 20 which is adapted to be connected to a tube 24. The sleeve nut 20 is provided with female threads 22 and is adapted to be threadably connected to the male threads 21 of a fitting element 18. The sleeve nut is provided with an abutment surface 19 and is arranged to abut against an abutment surface 33 of the fitting element and make a sealing contact therewith. The sleeve nut 20 comprises a nut portion whereby it may be turned by a suitable wrench or tool, and is provided with a counterbore 23 into which the end of the tube 24 is inserted. The tube may be of any suitable material and is further characterized as being outwardly extensible whereby a portion thereof may be expanded into the sleeve nut after insertion therein to make an internal expansion fit with the sleeve nut. Instead of being provided with female threads the coupling member 20 may be of the male type provided with male threads for connection to a threadable opening, as shown in my co-pending application Serial No. 574,468.

In Figure 1 of the drawing I show three longitudinally spaced internal grooves 25, 26 and 27 into which are respectively positioned three sealing rings 30, 31 and 32. An annular cylindrical wall 28 extends between the two grooves 25 and 26 and is of a larger internal diameter than the cylindrical wall means of the bore 23 which closely receives the tube 24. The two internal grooves 25 and 26 and the interconnecting annular cylindrical wall 28 may be characterized as enlarged internal wall means which define, in combination with the inserted tube, annular chamber means into which an expanded portion 29 of the tube may be expanded for making an expansion fit with the coupling member 20 with the sealing rings 30 and 31 positioned between the expansion fit. That is, the forward side of the groove 25 and the rearward side of the groove 26 are respectively opposed to and spaced from the forward and rearward sides of the expanded section 29 of the tube to receive respectively the sealing rings 30 and 31 therebetween to provide for relative turning movement between the coupling member 20 and the tube. The expanded portion 29 of the tube may be expanded outwardly by any suitable means and in its expanded position it makes a relatively close engagement with the annular cylindrical wall 28 to produce a piston effect with the annular cylindrical wall 28, whereby when the tube is moved longitudinally in either one of the two directions, relative movement of the expanded portion 29 of the tube within the annular cylindrical wall 28 compresses the sealing ring against the opposing end wall which extends outwardly from the cylindrical wall of the bore 23. The piston effect or relatively close engagement between the expanded portion 29 of the tube and the annular cylindrical wall 28 prevents the sealing means from extrusion therebetween. The opposing end walls of the grooves 25 and 26 against which the sealing rings are compressed upon longitudinal movement of the tube in either longitudinal direction extend inwardly and respectively meet with the bore 23 to define with said bore annular junctures. The sealing rings 30 and 31 respectively seal the space between the tube and the opposing end walls at said junctures. The cylindrical wall of the bore 23 makes a relatively close fit at said junctures with the tube whereby the sealing means is prevented from extrusion between the tube and the cylindrical wall of the bore 23. The sealing means is subject to compression and the higher the pressure of the fluid in the tube the greater the sealing action effected by the sealing means. The side walls of the groove 26 extend inwardly and respectively meet with the bore 23 to define junctures. The sealing ring 32 seals the spaces between the tube and the side walls at said junctures. Although any suitable sealing means may be provided, I preferably employ the standard O ring now available on the market and they may comprise resilient and substantially noncompressible material of a rubber-like nature for making a good sealing engagement between the sleeve nut and the tube. The sealing ring 32 may be placed relatively close to the right-hand end of the sleeve nut and besides the function of being a seal it also acts to absorb vibration between the tube and the sleeve nut 20. In addition, it prevents water or moisture from seeping inwardly into the sleeve nut.

The Figure 1 as well as the other Figures 2 to 4 are drawn to double scale for a one-half inch tube. The O rings are $\frac{3}{32}$ of an inch in body cross-section and are adapted to engagingly surround the tube to make a good seal therebetween. The expansion fit with the sealing means therebetween is such that the sleeve nut 20 is turnable with reference to the tube 24 so that the sleeve nut may be threadably connected to the threaded fitting element without twisting the tube. The annular cylindrical wall 28 is substantially $\frac{3}{32}$ of an inch greater in diameter than the external diameter of the tube 24, and thus the expanded portion of the tube when subject to longitudinal movement with reference to the sleeve nut presses against the lower half of the sealing ring. In this manner, a relatively large body of resilient and substantially noncompressible material is available to absorb vibration over and above that which is directly between the expansion fit. The expanded portion 29 of the tube begins to extend outwardly at a point along the tube near the opposing end wall, whereby the clearance between the tube and the cylindrical wall of the bore 23 diminishes as the sealing means is compressed thereby substantially blocking extrusion of the sealing means along the tube. The expanded portion 29 of the tube partially compresses the sealing means whereby a good initial pressure exists between the sealing means and the tube so that for low pressure the sealing means always provides a good seal. As the fluid pressure increases the expanded portion 29 of the tube is caused to compress the sealing means over and above the initial pressure with the result that the higher the pressure of the fluid the greater the sealing action. The expanded portion of the tube does not initially compress the sealing means too tightly and thus the sleeve nut may be turned with reference to the tube when being threadably connected to a threaded fitting element. In the claims, the internal grooves 25, 26 and 27 plus the annular cylindrical wall 28 may be referred to as enlarged internal wall means which defines with the tube annular chamber means. The chamber means may be further sub-divided by characterizing the internal grooves 25 and 26 and the annular cylindrical wall therebetween as internal wall means or a first chamber, and the annular groove 27 may be referred to as a second chamber. The sealing ring 30 is disposed in advance of the expanded portion 29 of the tube, that is, on the forward side of the expanded portion 29 and is the first sealing ring to be influenced by the fluid pressure. The sealing rings 31 and 32 are disposed on the rearward side of the expanded portion 29 of the tube and constitutes a further means for making a seal between the tube and the sleeve nut.

Tests involving the tensile strength of the connection show that the connection is stronger than the tube itself, and furthermore, the higher the fluid pressure the greater the sealing action between the sleeve nut and the tube.

The Figures 2, 3 and 4, show sub-combinations of the Figure 1. In Figure 2, the internal groove 27 and the sealing ring 32 are omitted. In Figure 3, the internal groove 25 and the sealing ring 30 are omitted. In Figure 4, the internal groove 26 and the sealing ring 31 are omitted.

With this invention, sleeve nuts may be standardized for different tube sizes, whereby one universal sleeve nut for each tube will meet all commercial applications. For high temperature work the sealing means may be constructed of a high heat-resisting material.

The annular cylindrical wall 28 limits the extent to which the tube may be expanded to prevent rupturing of the tube. The sealing means resiliently holds and supports the tube in the coupling member to the end that the sealing means not only seals the connection against fluid pressure but also absorbs vibration.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A tube coupling member disposed to be turnably and sealingly connected to a tube portion inserted therein, said coupling member having a counterbore extending inwardly from an end thereof, said counterbore having a cylindrical wall to closely receive the tube and enlarged internal wall means to receive an expanded section of the tube portion and first and second sealing means, said enlarged internal wall means having first and second grooves longitudinally disposed from each other and spaced inwardly from said end to receive respectively said first and second sealing means prior to the insertion of the tube into the counterbore, said first and second grooves having respectively first and second inwardly extending wall portions meeting with the cylindrical wall to define therewith first and second junctures, said first inwardly extending wall portion and the tube being engageable by the first sealing means for effecting a sealing engagement therebetween at said first juncture, said second inwardly extending wall portion and the tube being engageable by the second sealing means for effecting a sealing engagement therebetween at said second juncture, at least said first inwardly extending wall portion being opposed to and longitudinally spaced from the expanded section of the tube to receive the first sealing means between the said first wall portion and the expanded section of the tube, said first sealing means being turnably engageable by the expanded section of the tube portion to provide for relative turning movement between the coupling member and the tube.

2. A tube coupling member disposed to be turnably and sealingly connected to a tube portion inserted therein, said coupling member having a counterbore extending inwardly from an end thereof, said counterbore having a cylindrical wall to closely receive the tube and enlarged internal wall means to receive an expanded section of the tube portion and first and second sealing means, said enlarged internal wall means having first and second grooves longitudinally disposed from each other and spaced inwardly from said end to receive respectively said first and second sealing means prior to the insertion of the tube into the counterbore, said first and second grooves having respectively first and second inwardly extending wall portions meeting with the cylindrical wall to define therewith first and second junctures, said first inwardly extending wall portion and the tube being engageable by the first sealing means for effecting a sealing engagement therebetween at said first juncture, said second inwardly extending wall portion and the tube being engageable by the second sealing means for effecting a sealing engagement therebetween at said second juncture, at least said first inwardly extending wall portion being opposed to and longitudinally spaced from one side of the expanded section of the tube to receive the first sealing means therebetween and said second inwardly extending wall portion being opposed to and longitudinally spaced from the opposite side of the expanded section of the tube to receive the second sealing means therebetween, said first and second sealing means being turnably engageable by the expanded section of the tube portion to provide for relative turning movement between the coupling member and the tube.

3. A tube coupling member disposed to be turnably and sealingly connected to a tube portion inserted therein, said coupling member having a counterbore extending inwardly from an end thereof, said counterbore having a cylindrical wall to closely receive the tube and enlarged internal wall means to receive an expanded section of the tube portion and first and second sealing means, said enlarged internal wall means having first and second grooves longitudinally disposed from each other and spaced inwardly from said end to receive respectively said first and second sealing means prior to the insertion of the tube into the counterbore, said first and second sealing means being respectively disposed on opposite sides of and turnably engageable by said expanded section of the tube portion to provide for relative turning movement between the coupling member and the tube.

4. A tube coupling member disposed to be turnably and sealingly connected to a tube portion inserted therein, said coupling member having a counterbore extending inwardly from an end thereof, said counterbore having a cylindrical wall to closely receive the tube and enlarged internal wall means to receive an expanded section of the tube portion and first and second sealing means, said enlarged internal wall means having first and second grooves longitudinally disposed from each other and spaced inwardly from said end to receive respectively said first and second sealing means prior to the insertion of the tube into the counterbore, said first and second sealing means being respectively disposed on opposite sides of and turnably engageable by said expanded section of the tube portion to provide for relative turning movement between the coupling member and the tube, said enlarged internal wall means having an interconnecting wall extending between said grooves and defining an annular surface into which said expanded section of the tube turnably fits.

5. A tube coupling member disposed to be turnably and sealingly connected to a tube portion inserted therein, said coupling member having a counterbore extending inwardly from an end thereof, said counterbore having a cylindrical wall to closely receive the tube and enlarged internal wall means to receive an expanded section of the tube portion and first and second sealing means, said enlarged internal wall means having first and second grooves longitudinally disposed from each other and spaced inwardly from said end to receive respectively said first and second sealing means prior to the insertion of the tube into the counterbore, said first and second sealing means being respectively disposed on opposite sides of and turnably engageable by said expanded section of the tube portion to provide for relative turning movement between the coupling member and the tube, said enlarged internal wall means having an interconnecting wall extending between said grooves and defining an annular surface into which said expanded section of the tube turnably fits, said grooves extending outwardly for a greater radial distance than said interconnecting wall to receive sealing means having a greater diameter than the expanded section of the tube.

GEORGE V. WOODLING.

REFERENCES CITED

The following references are of record in the file of this patent:

UNITED STATES PATENTS

| Number | Name | Date |
| --- | --- | --- |
| 310,264 | Emery | Jan. 6, 1885 |
| 2,233,471 | Clements | Mar. 4, 1941 |
| 2,358,291 | Fentress | Sept. 12, 1944 |